(12) United States Patent
Hosamane et al.

(10) Patent No.: US 10,055,589 B2
(45) Date of Patent: Aug. 21, 2018

(54) SYSTEMS AND METHODS FOR VALIDATING AUXILIARY POWER UNIT OR COMPONENTS BY SECURE PIN ONE TIME PASSWORD

(71) Applicant: HONEYWELL INTERNATIONAL INC., Morris Plains, NJ (US)

(72) Inventors: Somashekhar M Maheswarappa Hosamane, Bangalore (IN); Jayakumar Ramakrishnapillai, Bangalore (IN); Ravi Govindarajulu, Bangalore (IN); Likhith Chikkegowda, Bangalore (IN); Karthikeyan Kandavel, Bangalore (IN); Jay Gould, Long Beach, CA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/253,061

(22) Filed: Aug. 31, 2016

(65) Prior Publication Data

US 2018/0060590 A1 Mar. 1, 2018

(51) Int. Cl.
*G06F 21/00* (2013.01)
*G06F 21/57* (2013.01)
*H04L 9/32* (2006.01)

(52) U.S. Cl.
CPC .......... *G06F 21/575* (2013.01); *H04L 9/3236* (2013.01); *G06F 2221/034* (2013.01)

(58) Field of Classification Search
CPC . G06F 21/575; G06F 2221/034; H04L 9/3236
See application file for complete search history.

(56) References Cited

U.S. PATENT DOCUMENTS

| | | | |
|---|---|---|---|
| 5,745,045 A * | 4/1998 | Kulha | B60R 25/04 235/382 |
| 6,105,136 A | 8/2000 | Cromer et al. | |

(Continued)

FOREIGN PATENT DOCUMENTS

| WO | 2012/130257 A1 | 10/2012 |
|---|---|---|
| WO | 2013003931 A1 | 1/2013 |

OTHER PUBLICATIONS

Hein, Butster, "Everything You Need to Know About iOS' Crippling Error 53.", Http://www.cultofmac.com/author/Busterheine/, Feb. 9, 2016.

(Continued)

*Primary Examiner* — Mohammed Waliullah
(74) *Attorney, Agent, or Firm* — Lorenz & Kopf, LLP (57) ABSTRACT

Systems and methods are provided for validating a vehicle component. The system includes a vehicle electronic control unit (ECU) in electronic communication with a power unit via a communications bus. The vehicle ECU is configured to detect an electronic connection between the vehicle ECU and the power unit and transmit a power start up signal to the power unit when the power unit is authenticated to start up. The power unit is authenticated to start up when a power unit start-up program passcode stored in a memory of the vehicle ECU matches a predetermined ECU passcode. The vehicle ECU is configured to erase the power unit start-up program passcode from the memory when the power unit is disconnected from the communications bus. The vehicle ECU is configured to re-authenticate the power unit to start up when a new power unit start-up program passcode is stored in the memory that matches another predetermined ECU passcode.

18 Claims, 8 Drawing Sheets

(56) References Cited

U.S. PATENT DOCUMENTS

| | | | |
|---|---|---|---|
| 6,317,836 B1* | 11/2001 | Goren | G06F 21/34 |
| | | | 726/36 |
| 7,019,625 B2 | 3/2006 | Harada | |
| 7,317,262 B2 | 1/2008 | Nishijima et al. | |
| 7,855,470 B2 | 12/2010 | Konno | |
| 8,294,893 B2 | 10/2012 | Yamauchi | |
| 8,667,295 B1 | 3/2014 | Dunning | |
| 9,281,942 B2 | 3/2016 | Leboeuf et al. | |
| 2003/0120922 A1* | 6/2003 | Sun | G06F 21/575 |
| | | | 713/168 |
| 2004/0170068 A1 | 9/2004 | Williams | |
| 2005/0187674 A1 | 8/2005 | Ando | |
| 2015/0213257 A1* | 7/2015 | Lai | G06F 21/45 |
| | | | 726/6 |
| 2015/0263856 A1* | 9/2015 | Leboeuf | H04L 9/0866 |
| | | | 713/184 |

OTHER PUBLICATIONS

Extended EP Search Report for Application No. 17186339.2-1218 dated Jan. 17, 2018.

* cited by examiner

SYSTEMS AND METHODS FOR VALIDATING AUXILIARY POWER UNIT OR COMPONENTS BY SECURE PIN ONE TIME PASSWORD

TECHNICAL FIELD

The present invention generally relates to part validation, and more particularly to validating auxiliary power units, engines, and components on a vehicle.

BACKGROUND

Conventionally, an auxiliary power unit (APU), engines, and other components of a vehicle may be replaced in the field either by a field service engineer (FSE) or at maintenance repair and overhaul (MRO) shop. In a conventional repair process, the APU or component is removed from a vehicle by an FSE or authorized person and is repaired either at the original equipment manufacturer (OEM) or at an MRO shop. Unfortunately, the OEM does not have trace on whether the OEM APU, engines, or component is being repaired by an authorized FSE, MRO Shops using OEM supplied technical manuals (like service bulletins, repair manuals, etc) unless the vehicle owner or FSE or MRO Shops informs the OEM about the repair or places an order for spare parts.

While many vehicle owners visit unauthorized MRO shops and get the OEM APUs, Engines or components repaired and refitted on the vehicle, there is a possibility that counterfeit parts may fit into OEM APUs, engines, or components and also owners may swap APUs between vehicles as per their requirement. The OEM will not have control on swapping of APUs between vehicles and also will not be always informed about the repair. Furthermore, as OEMs sell and lease APUs to customers and operators of vehicles, for example in fleet services, the OEM should know the exact hours of APU usage when the APU is leased for accurate billing. The OEM APU billing team relies on data on APU and vehicle usage and if an APU is swapped between vehicles, it will be difficult for the OEM to calculate accurate APU usage and billing.

Accordingly, it is desirable to provide systems and methods for validating APUs, engines, and components on a vehicle. Other desirable features and characteristics of the present invention will become apparent from the subsequent detailed description and the appended claims, taken in conjunction with the accompanying drawings and the foregoing technical field and background.

BRIEF SUMMARY

Various embodiments of a system for collecting line replaceable unit removal data and a method for collecting line replaceable unit removal data are disclosed herein.

In one embodiment, a method for validating a vehicle component includes detecting an electronic connection between an electronic control unit (ECU) and a power unit over a communications bus. The method further includes comparing a power unit start-up program passcode stored in a memory of the ECU to at least one predetermined ECU passcode and authenticating the power unit to start-up with the ECU when the power unit start-up program passcode matches the ECU passcode. The method further includes transmitting a power up signal from the ECU to the power unit when the power unit is authenticated and monitoring the communications bus for when the power unit is disconnected from the communications bus. The method further includes erasing the power unit start-up program passcode from the memory of the ECU when the power unit is disconnected from the bus and storing a new power unit start-up program passcode in the memory. The method further includes re-authenticating the power unit with the ECU when the new power unit start-up program passcode matches another of the predetermined ECU passcodes.

In another embodiment, a system for validating a vehicle component includes a communications bus, a power unit in electronic connection with the communication bus, and an electronic control unit (ECU) having a processor and a memory. The ECU is in electronic connection with the communication bus and the ECU is configured to detect an electronic connection between the ECU and the power unit. The ECU is further configured to transmit a power up signal to the power unit when the power unit is authenticated to start up. The power unit is authenticated to start up when a power unit start-up program passcode stored in the memory of the ECU matches at least one predetermined ECU passcode. The ECU is configured to erase the power unit start-up program passcode from the memory of the ECU when the power unit is disconnected from the communications bus. The ECU is configured to re-authenticate the power unit to start up when a new power unit start-up program passcode is stored in the memory that matches another of the predetermined ECU passcodes.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor module (shared, dedicated, or group) and memory module that executes one or more software or firmware programs, a combinational logic circuit, and/or other suitable components that provide the described functionality.

Figure 1:
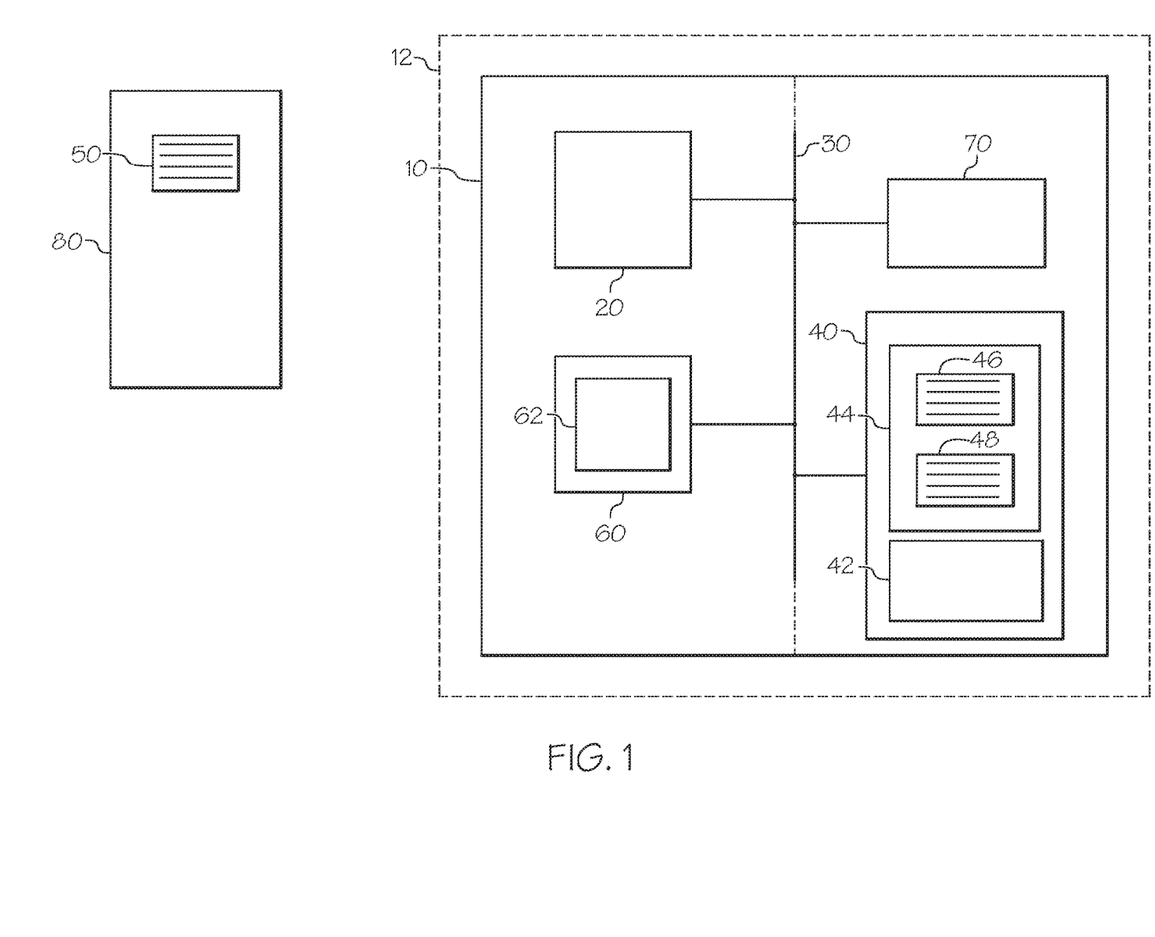
FIG. 1 is a schematic representation of the system for validating a vehicle component in accordance with an exemplary embodiment.

With reference now to FIG. 1, a system 10 for validating a vehicle component is shown herein. The system 10 is generally implemented in a vehicle 12. In a non-limiting embodiment, exemplary vehicles 12 include aircraft, automobiles, locomotives, helicopters, motorcycles, and the like. The system 10 includes a power unit 20 in electronic communication with a communications bus 30. A vehicle electronic control unit (ECU) 40 having a processor 42 and a memory 44 is further in electronic communication with the communications bus 30. A power unit start-up program passcode 46 and at least one predetermined ECU passcode 48 are stored in the memory 44 of the vehicle ECU 40.

The power unit 20 generally refers to the engine, motor, or power source of the vehicle 12. For example, the power unit 20 may be an internal combustion engine, jet engine, hybrid drive train, etc. One skilled in the art will appreciate that the power unit 20 as disclosed herein encompasses power units 20 used in vehicles 12, and is not limited to any one specific type of power unit 20. Furthermore, while the power unit 20 is only shown as being in electronic communication with the communications bus 30 of the vehicle 12 in the schematic representation of FIGS. 1-3, one skilled in the art will appreciate that additional connections, fuel lines, etc. are not shown in the Figures for easier understanding.

The communications bus 30 allows the vehicle ECU 40 to communicate with other systems and components connected to the communications bus 30. In an example, the communications bus 30 is a CAN network, however one skilled in the art will appreciate that various communication networks such as FlexRay, A2B, Switched Ethernet, or other known communication networks may be implemented as the communications bus 30. Thus, the present disclosure is not limited to any specific type of communication bus 30 or protocol. Furthermore, while the components of the system 10 are depicted in communication through a direct connection for simplicity, one skilled in the art will appreciate that the system 10 may be implemented over the communications bus 30 in various arrangements and electrical connections. For example, the communications bus 30 may include wireless connections (not shown) along with direct wired connections.

The vehicle ECU 40 is configured to detect an electronic connection between the vehicle ECU 40 and the power unit 20. The vehicle ECU 40 is generally used to control the operation of the power unit 20. The vehicle ECU 40 is further configured to transmit a power up signal to the power unit 20, which allows the power unit 20 to start up, when the power unit 20 is authenticated to start up. The vehicle ECU 40 authenticates the power unit 20 to start up when a power unit start-up program passcode 46 stored in the memory 44 of the vehicle ECU 40 matches at least one predetermined ECU passcode 48 stored in the memory 44 of the vehicle ECU 40.

The power unit start-up program passcode 46 is a passcode that is initially entered in the memory 44 of the vehicle ECU 40 by the original equipment manufacturer (OEM) of the power unit 20 or the vehicle 12. In this way, the power unit start-up program passcode 46 is associated with the power unit 20 and the vehicle ECU 40 of the vehicle 12 when the vehicle is manufactured by the OEM.

The predetermined ECU passcodes 48 are a plurality of passcodes that are initially entered in the memory 44 of the vehicle ECU 40 by the OEM. In a non-limiting embodiment, the predetermined ECU passcodes 48 are a plurality sets of random numbers. In a non-limiting embodiment, the predetermined ECU passcodes 48 are associated with the vehicle ECU 40 and the vehicle 12 such that the OEM knows the specific ECU passcodes 48 stored in a specific vehicle ECU 40. This association can be made based on a vehicle identification number (VIN), an airframe identification number, an ECU identification number, a power unit identification number, or a combination thereof. In a non-limiting embodiment, the predetermined ECU passcodes 48 are digital certificates or software tokens.

Figure 2:
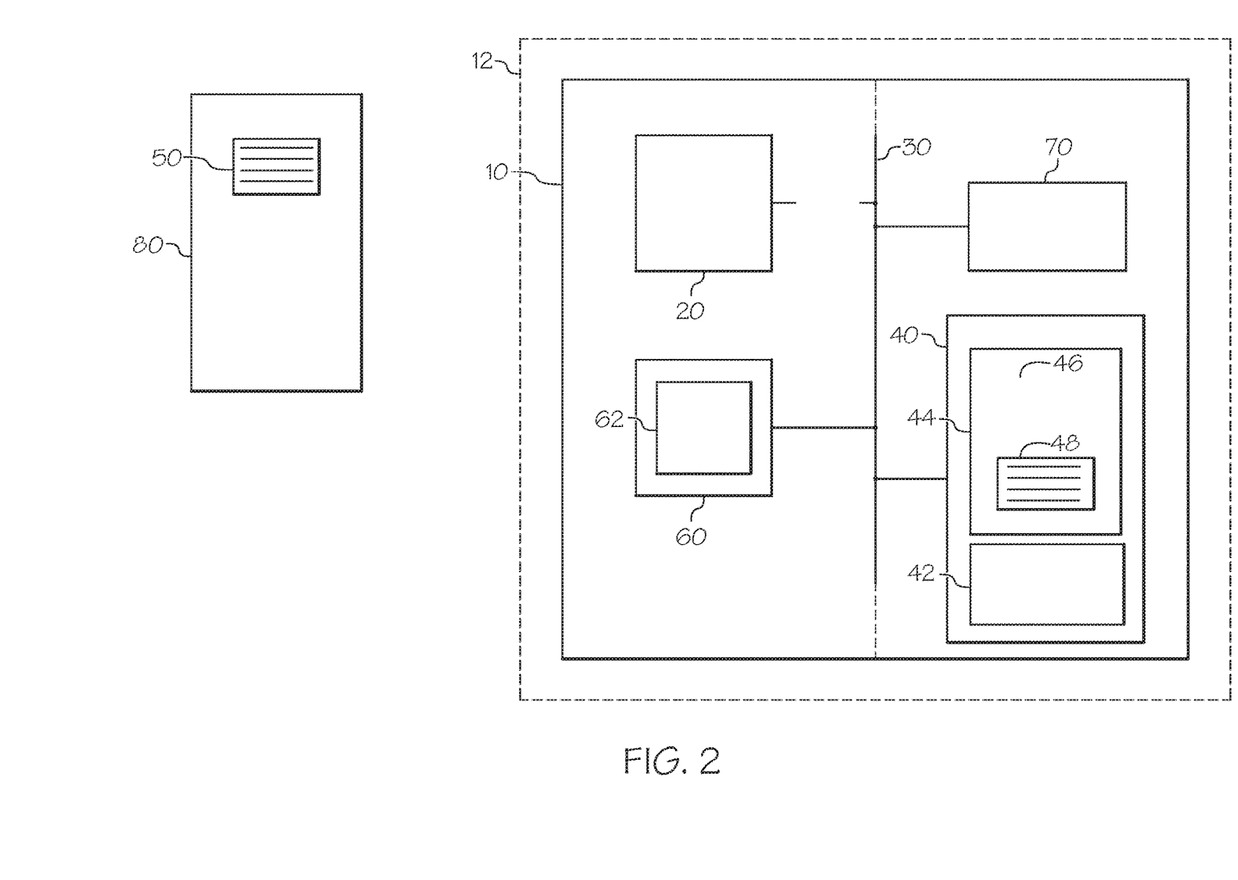
FIG. 2 is another schematic representation of the system for validating a vehicle component in accordance with the exemplary embodiment of FIG. 1.

As detailed above, the vehicle ECU 40 monitors the communications bus 30 to detect an electronic connection between the vehicle ECU 40 and the power unit 20. The power unit 20 may be disconnected from the communications bus 30 for service to be performed on the power unit 20 or to replace the power unit 20 used in the vehicle 12. With reference now to FIG. 2 and continuing reference to FIG. 1, when the vehicle ECU 40 detects that the power unit 20 has been disconnected from the communications bus 30, the vehicle ECU 40 is configured to erase the power unit start-up passcode 46 from the memory 44. Accordingly, the power unit 20 is now not authenticated to start up and the vehicle ECU 40 will not transmit the power up signal to the power unit 20 since there is no power unit start-up passcode 46 to match the predetermined ECU passcodes 48.

Figure 3:
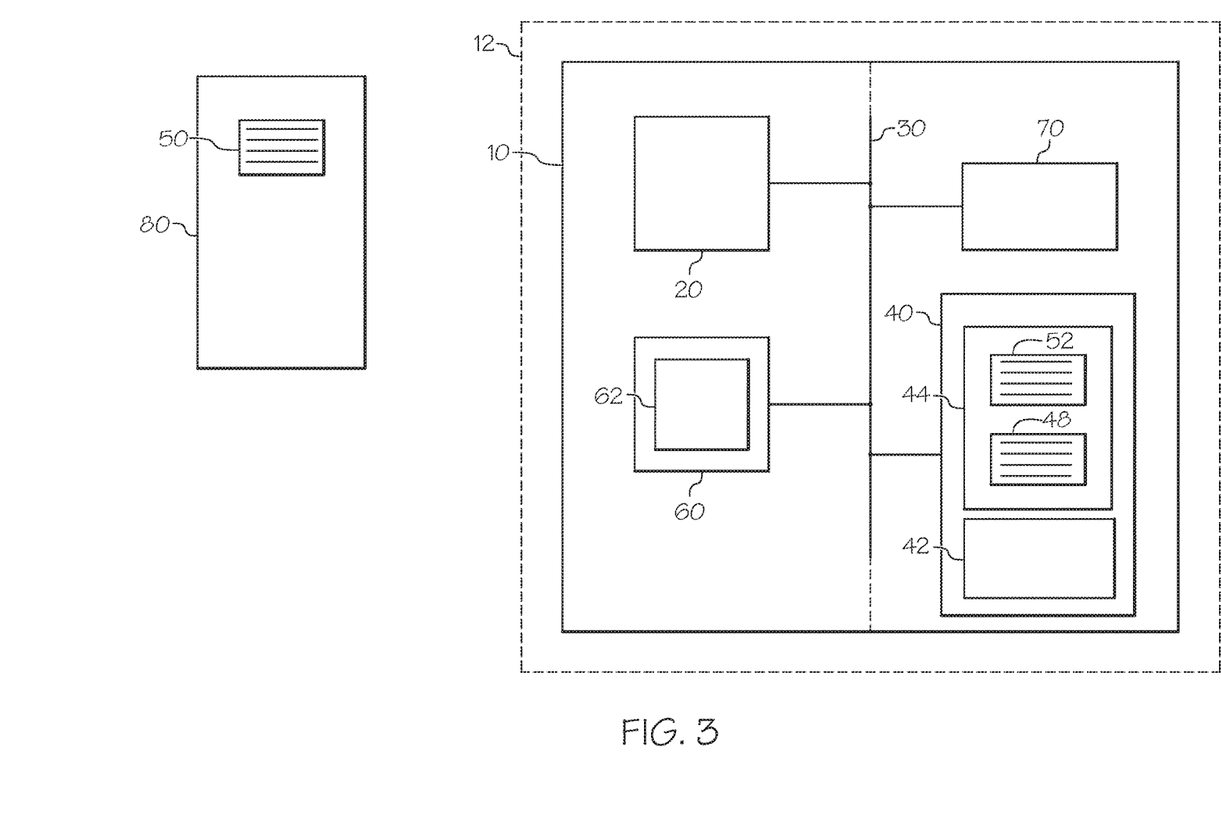
FIG. 3 is another schematic representation of the system for validating a vehicle component in accordance with the exemplary embodiment of FIGS. 1-2.

With reference now to FIG. 3 and continuing reference to FIGS. 1 and 2, in order for the power unit 20 to be re-authenticated to start up, a new power unit start-up program passcode 52 needs to be stored in the memory 44 and match another of the predetermined ECU passcodes 48. In a non-limiting embodiment, when the power unit 20 is reconnected to the communications bus 30, a field service engineer (FSE) stores the new power unit start-up program 52 in the memory 44. The vehicle ECU 40 then checks that the new power unit start-up program 52 matches another of the predetermined ECU passcodes 48 and, if so, re-authenticates the power unit 20 to start up. In this way, the power unit 20 can only be re-authenticated to start up when the new power unit start-up program 52 stored in the memory 44 matches another of the predetermined ECU passcodes 48.

In a non-limiting embodiment, the new power unit start-up program passcode 52 is obtained by the FSE from the OEM after providing the OEM with information relating to the vehicle 12 and the power unit 20. In this way, the OEM is able to identify the specific vehicle 12 that was serviced, the type of service performed, where the service was performed, etc., before providing the FSE with the new power unit start-up program passcode 52 necessary to start up the power unit 20. Non-limiting examples of information required to provide the FSE with the new power unit start-up program passcode 52 includes a vehicle identification number, power unit identification number, airframe identification number, ECU identification number, type of service performed, location of MRO shop, duration of service, or new power unit identification number. This information may be provided directly to the OEM or through an automated service such as a web page or secure portal. In this way, the new power unit start-up program passcode 52 is only provided when the required information is supplied to the OEM.

In a non-limiting embodiment of the system 10, the vehicle ECU 40 is configured to erase the predetermined ECU passcode 48 that corresponds to the power unit start-up program passcode 46 when the power unit 20 is disconnected from the communications bus 30. As detailed above, the predetermined ECU passcodes 48 include a plurality of passcodes that are initially entered in the memory 44 of the ECU by the OEM. When the power unit 20 is disconnected from the communications bus 30, in addition to erasing the power unit start-up program passcode 46, the vehicle ECU 40 further erases the specific predetermined ECU passcode 48 that matched the power unit start-up program passcode 46. This further ensures that the same power unit start-up program passcode 46 cannot be used to re-authenticate the power unit 20 to start up.

In a non-limiting embodiment of the system 10, the vehicle 12 further includes a display 60 having an input device 62 for inputting data into the system 10. In a non-limiting embodiment the display 60 is a touch screen display or a display 60 coupled with an input device 62 such as a keyboard. The display 60 and input device 62 may be used by the FSE to enter the new power unit start-up program passcode 52 into the memory 44 of the vehicle ECU 40. The display 60 may further provide the FSE with a prompt to enter the new power unit start-up program passcode 52.

In a non-limiting embodiment of the system 10, the vehicle further includes a new engine component 70 in electronic communication with the communications bus 30. In a non-limiting embodiment, when the vehicle ECU 40 detects that the new engine component 70 is connected to the communications bus 30, the vehicle ECU 40 is configured to erase the start-up program passcode 46 from the memory 44. In this way, by erasing the power unit start-up program passcode 46 the system 10 helps prevent unauthorized modifications of the vehicle 12 through the addition of new engine components 70 by disabling the power unit 20 from starting up.

In a non-limiting embodiment of the system 10, the new power unit start-up program passcode 52 is a time limit based passcode. For example, the OEM may provide the FSE with the new power unit start-up program passcode 52 having a time limit to allow the power unit 20 to temporarily start up and operate while a permanent new power unit start-up program passcode 52 is obtained. By way of example, if the power unit 20 is inadvertently disconnected from the communications bus 30, an owner or operator of the vehicle 12 may wish to quickly obtain the new power unit start-up program passcode 52 and may be unable to provide the OEM with all the required information as detailed above. In such a situation, the new power unit start-up program passcode 52 may have a time limit associated with it such that the power unit is able to operate for a predetermined period of time. For example, the predetermined period of time may include from several hours, several days, several weeks, etc., as established by the OEM.

In a non-limiting embodiment of the system 10, the new power unit start-up program passcode 52 is a stop/start cycle passcode with a predetermined number of start/stop cycles of the power unit 20. Similar to the time based passcode, the OEM may provide the FSE with the new power unit start-up program passcode 52 having a predetermined number of start/stop cycles allow the power unit 20 to temporarily start up and operate while a permanent new power unit start-up program passcode 52 is obtained. As with the time based passcode, the predetermined number of start/stop cycles may include any number of cycles ranging from a single start/stop to hundreds of start/stops, as established by the OEM.

In a non-limiting embodiment of the system 10, the system 10 further includes a remote server 80. The remote server 80 is a computer or network device configured to receive a request from the vehicle ECU 40 and provide data or a resource to the vehicle ECU 40 in response to the request. In a non-limiting embodiment, the remote server 80 is configured to store the new power unit start-up program passcode 50 and provide the vehicle ECU 40 with the new power unit start-up program passcode 50 when the vehicle ECU 40 makes a request. In contrast to requiring the FSE to provide the OEM with the information detailed above, the vehicle ECU 40 can provide the remote server 80 with the information automatically and request the new power unit start-up program passcode 50 directly from the remote server 80. While not disclosed herein, one skilled in the art will appreciate that the vehicle ECU 40 may communicate with the remote server 80 using the Internet via any number of connections and communication protocols not contemplated by the present disclosure.

In a non-limiting embodiment of the system 10, the vehicle ECU 40 is configured to alert the remote server 80 when the new power unit start-up program passcode 52 stored in the memory 44 does not match any of the predetermined ECU passcodes 48. In a non-limiting embodiment of the system 10, the vehicle ECU 40 is configured to alert the remote server 80 when the power unit 20 is disconnected from the communications bus 30 or when the new engine component 70 is connected to the communications bus 30. In this way, the vehicle ECU 40 can alert the remote server 80, and the OEM, of situations in which unauthorized maintenance or tampering of the vehicle 12 occurs.

In a non-limiting embodiment of the system 10, the vehicle ECU 40 is configured to disable the power unit 20 when the new power unit start-up program passcode 52 does not match any of the predetermined ECU passcodes 48. For example, the vehicle ECU 40 may disable the power unit 20 by transmitting a disabling signal to the power unit 20 over the communications bus 30. Such a situation may occur when unauthorized maintenance or tampering of the vehicle 12 occurs and the FSE or technician tries to circumvent the system 10. In this way, the system discourages unauthorized maintenance or tampering of the vehicle 12 and forces the FSE or technician to obtain the new power unit start-up program passcode 52 from the OEM or risk disabling the power unit 20.

Figure 4:
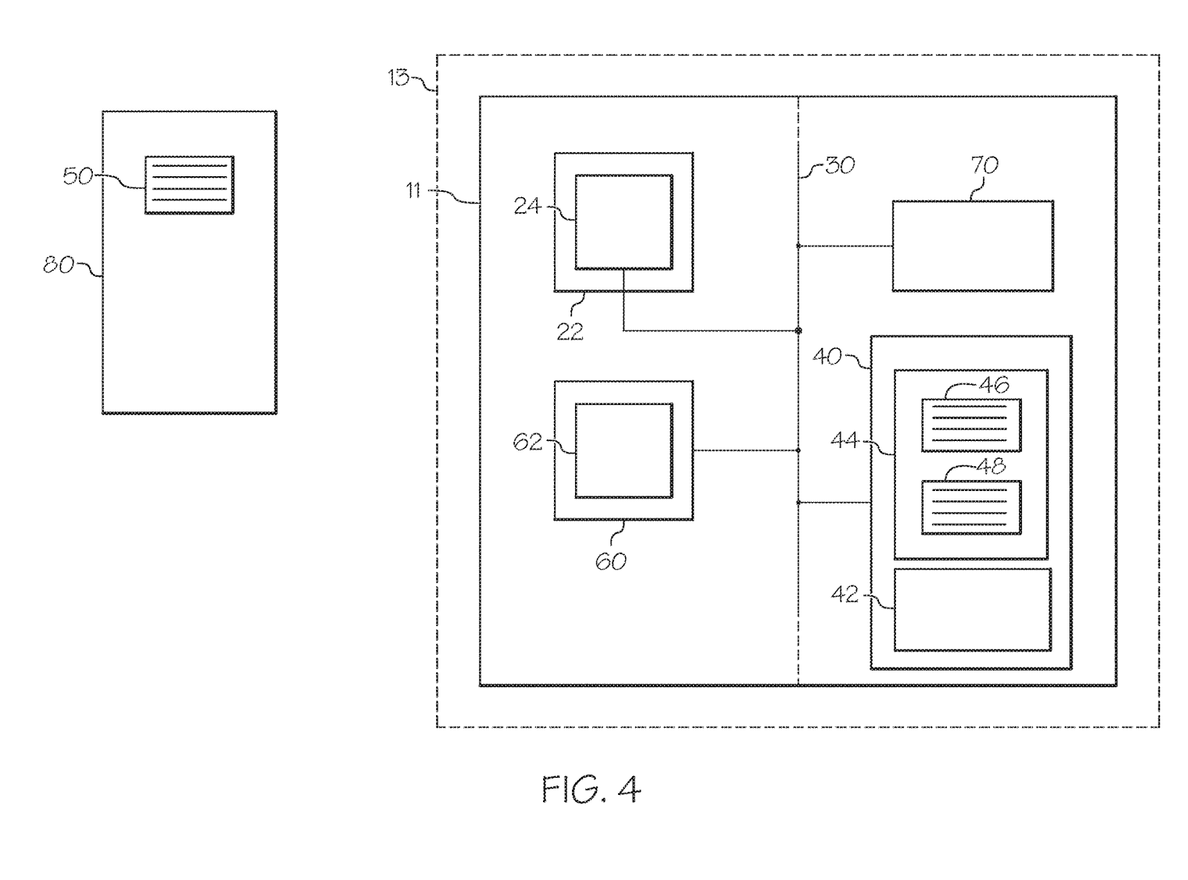
FIG. 4 is a schematic representation of the system for validating a vehicle component in accordance with another exemplary embodiment.
Figure 5:
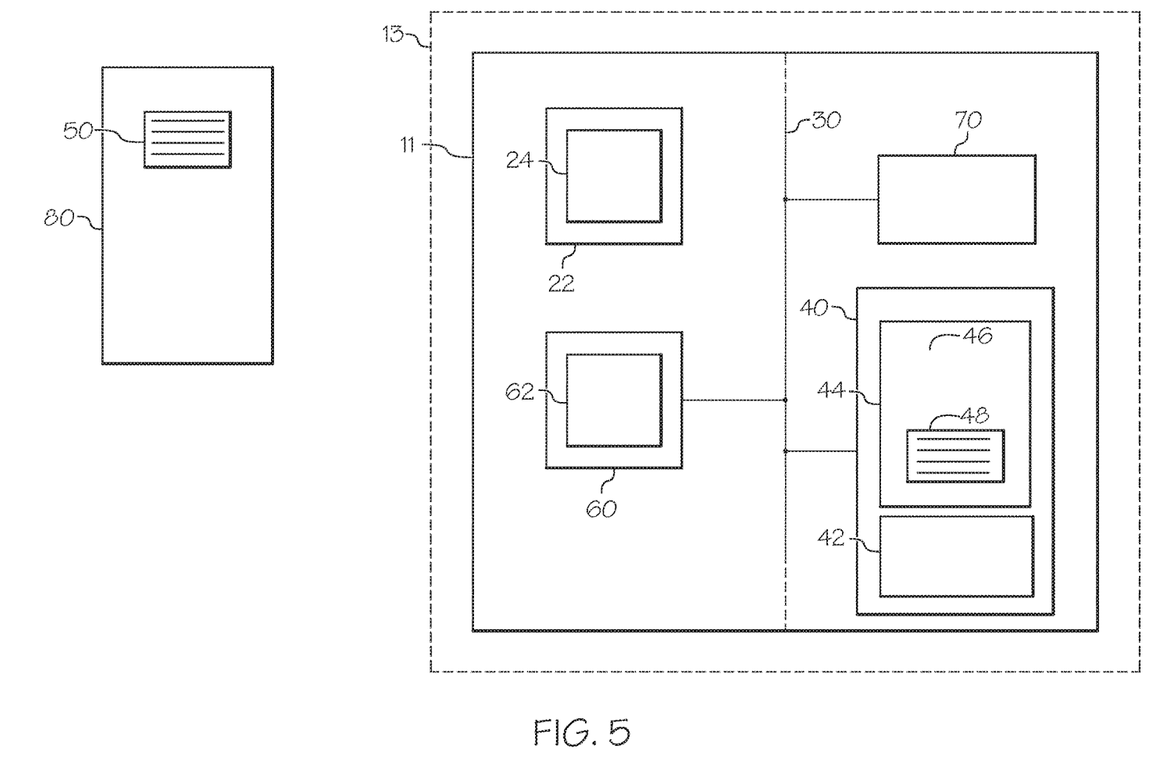
FIG. 5 is another schematic representation of the system for validating a vehicle component in accordance with the exemplary embodiment of FIG. 4.
Figure 6:
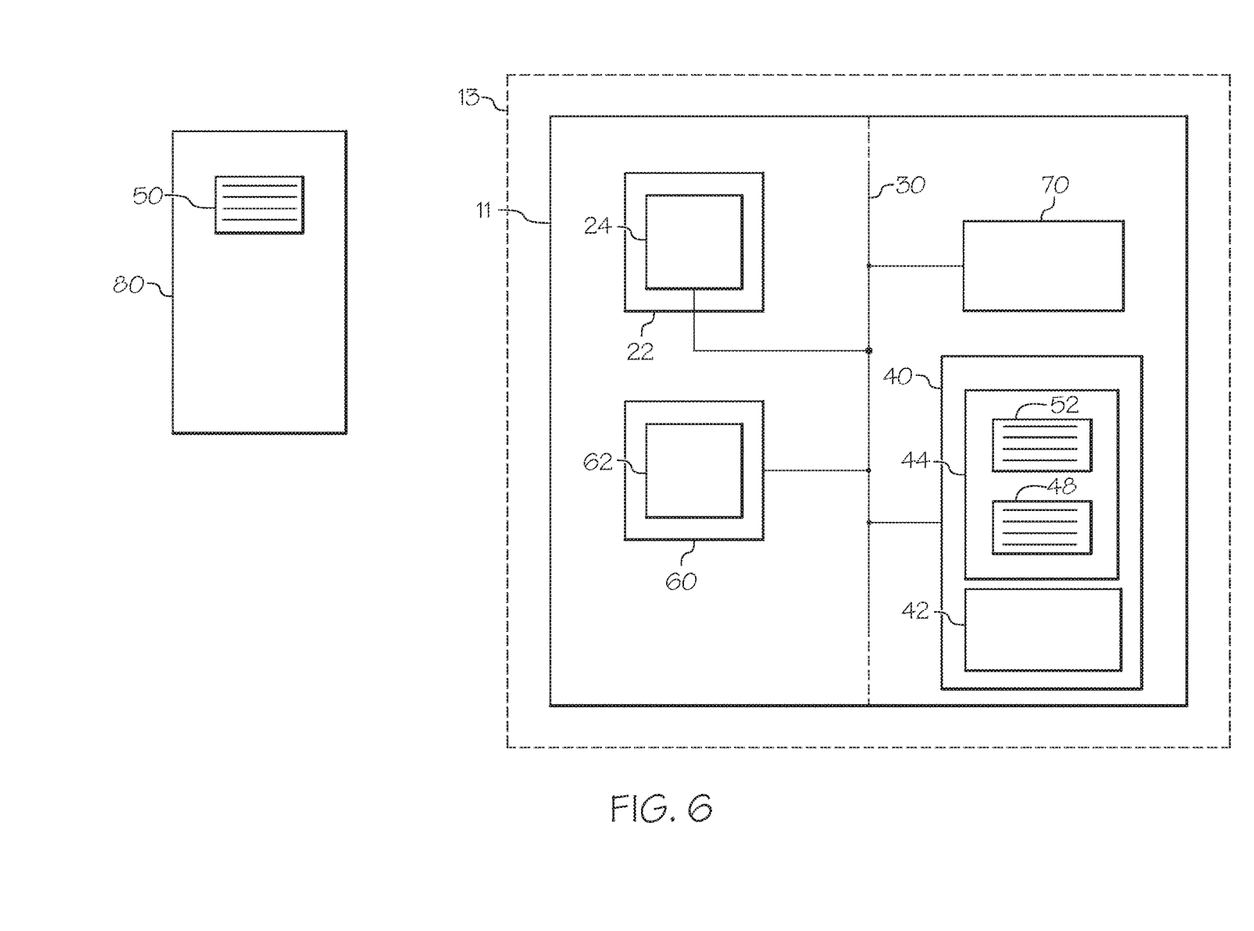
FIG. 6 is another schematic representation of the system for validating a vehicle component in accordance with the exemplary embodiment of FIGS. 4-6.

With reference now to FIGS. 4-6, a system 11 for validating a vehicle component is shown herein. As system 11 includes many of the same components from system 10 from FIGS. 1-3, the reference numbers will be used and referenced when appropriate. Accordingly, the discussion of system 11 will relate to the additional components not found in system 10. The system 10 is generally implemented in a vehicle 13. In a non-limiting embodiment, exemplary vehicles 13 include aircraft, automobiles, locomotives, helicopters, motorcycles, and the like. The vehicle 13 from system 11 includes a power unit 22 having a power unit electronic control unit (ECU) 24. In system 10, the power unit 20 was controlled by the vehicle ECU 40 and did not have its own dedicated ECU. In contrast, the power unit 22 in system 11 has its own internal power unit ECU 24 for controlling the power unit 22. However, the vehicle ECU 40 is still responsible for authenticating the power unit ECU 24 and transmitting the power up signal to the power unit ECU 24 consistent with the present disclosure.

The power unit ECU 24 is in electronic communication with the communications bus 30. The vehicle electronic control unit (ECU) 40 has the processor 42 and the memory 44 and is in electronic communication with the communications bus 30. The power unit start-up program passcode 46 and the at least one predetermined ECU passcode 48 are stored in the memory 44 of the vehicle ECU 40.

The vehicle ECU 40 is configured to detect an electronic connection between the vehicle ECU 40 and the power unit ECU 24. The vehicle ECU 40 is further configured to transmit a power up signal to the power unit ECU 24, which allows the power unit 22 to start up, when the power unit 22 is authenticated to start up. The vehicle ECU 40 authenticates the power unit 22 to start up when a power unit start-up program passcode 46 stored in the memory 44 of the vehicle ECU 40 matches at least one predetermined ECU passcode 48 stored in the memory 44 of the vehicle ECU 40.

The power unit start-up program passcode 46 is a passcode that is initially entered in the memory 44 of the vehicle ECU 40 by the original equipment manufacturer (OEM) of the power unit 22 or the vehicle 13. In this way, the power unit start-up program passcode 46 is associated with the power unit 22 and the vehicle ECU 40 of the vehicle 13 when the vehicle is manufactured by the OEM.

The predetermined ECU passcodes 48 are a plurality of passcodes that are initially entered in the memory 44 of the vehicle ECU 40 by the OEM. In a non-limiting embodiment, the predetermined ECU passcodes 48 are a plurality sets of random numbers. In a non-limiting embodiment, the predetermined ECU passcodes 48 are associated with the vehicle ECU 40 and the vehicle 13 such that the OEM knows the specific ECU passcodes 48 stored in a specific vehicle ECU 40. This association can be made based on a vehicle identification number (VIN), an airframe identification number, an ECU identification number, a power unit identification number, or a combination thereof. In a non-limiting embodiment, the predetermined ECU passcodes 48 are digital certificates or software tokens.

As detailed above, the vehicle ECU 40 monitors the communications bus 30 to detect an electronic connection between the vehicle ECU 40 and the power unit ECU 24. The power unit ECU 24 may be disconnected from the communications bus 30 for service to be performed on the power unit 22 or the power unit ECU 24, or to replace the power unit 22 used in the vehicle 13. With reference now to FIG. 5 and continuing reference to FIG. 4, when the vehicle ECU 40 detects that the power unit ECU 24 has been disconnected from the communications bus 30, the vehicle ECU 40 is configured to erase the power unit start-up passcode 46 from the memory 44. Accordingly, the power unit 22 is now not authenticated to start up and the vehicle ECU 40 will not transmit the power up signal to the power unit ECU 24 since there is no power unit start-up passcode 46 to match the predetermined ECU passcodes 48.

With reference now to FIG. 6 and continuing reference to FIGS. 4 and 5, in order for the power unit 22 to be re-authenticated to start up, a new power unit start-up program passcode 52 needs to be stored in the memory 44 and match another of the predetermined ECU passcodes 48.

In a non-limiting embodiment, when the power unit ECU 24 is reconnected to the communications bus 30, a field service engineer (FSE) stores the new power unit start-up program 52 in the memory 44. The vehicle ECU 40 then checks that the new power unit start-up program 52 matches another of the predetermined ECU passcodes 48 and, if so, re-authenticates the power unit 22 to start up. In this way, the power unit 22 can only be re-authenticated to start up when the new power unit start-up program 52 stored in the memory 44 matches another of the predetermined ECU passcodes 48.

In a non-limiting embodiment, the new power unit start-up program passcode 52 is obtained by the FSE from the OEM after providing the OEM with information relating to the vehicle 13 and the power unit 22. In this way, the OEM is able to identify the specific vehicle 13 that was serviced, the type of service performed, where the service was performed, etc., before providing the FSE with the new power unit start-up program passcode 52 necessary to start up the power unit 22. Non-limiting examples of information required to provide the FSE with the new power unit start-up program passcode 52 includes a vehicle identification number, power unit identification number, airframe identification number, ECU identification number, type of service performed, location of MRO shop, duration of service, or new power unit identification number. This information may be provided directly to the OEM or through an automated service such as a web page or secure portal. In this way, the new power unit start-up program passcode 52 is only provided when the required information is supplied to the OEM.

In a non-limiting embodiment of the system 11, the vehicle ECU 40 is configured to erase the predetermined ECU passcode 48 that corresponds to the power unit start-up program passcode 46 when the power unit ECU 24 is disconnected from the communications bus 30. As detailed above, the predetermined ECU passcodes 48 include a plurality of passcodes that are initially entered in the memory 44 of the ECU by the OEM. When the power unit ECU 24 is disconnected from the communications bus 30, in addition to erasing the power unit start-up program passcode 46, the vehicle ECU 40 further erases the specific predetermined ECU passcode 48 that matched the power unit start-up program passcode 46. This further ensures that the same power unit start-up program passcode 46 cannot be used to re-authenticate the power unit 22 to start up.

In a non-limiting embodiment of the system 11, the vehicle 13 further includes the display 60 having the input device 62 for inputting data into the system 11. In a non-limiting embodiment the display 60 is a touch screen display or the display 60 coupled with the input device 62 such as a keyboard. The display 60 and input device 62 may be used by the FSE to enter the new power unit start-up program passcode 52 into the memory 44 of the vehicle ECU 40. The display 60 may further provide the FSE with a prompt to enter the new power unit start-up program passcode 52.

In a non-limiting embodiment of the system 11, the vehicle further includes a new engine component 70 in electronic communication with the communications bus 30. In a non-limiting embodiment, when the vehicle ECU 40 detects that the new engine component 70 is connected to the communications bus 30, the vehicle ECU 40 is configured to erase the start-up program passcode 46 from the memory 44. In this way, by erasing the power unit start-up program passcode 46 the system 11 helps prevent unauthorized modifications of the vehicle 13 through the addition of new engine components 70 by disabling the power unit 22 from starting up.

In a non-limiting embodiment of the system 11, the new power unit start-up program passcode 52 is a time limit based passcode. For example, the OEM may provide the FSE with the new power unit start-up program passcode 52 having a time limit to allow the power unit 22 to temporarily start up and operate while a permanent new power unit start-up program passcode 52 is obtained. By way of example, if the power unit ECU 24 is inadvertently disconnected from the communications bus 30, an owner or operator of the vehicle 13 may wish to quickly obtain the new power unit start-up program passcode 52 and may be unable to provide the OEM with all the required information as detailed above. In such a situation, the new power unit start-up program passcode 52 may have a time limit associated with it such that the power unit is able to operate for a predetermined period of time. For example, the predetermined period of time may include from several hours, several days, several weeks, etc., as established by the OEM.

In a non-limiting embodiment of the system 11, the new power unit start-up program passcode 52 is a stop/start cycle passcode with a predetermined number of start/stop cycles of the power unit 22. Similar to the time based passcode, the OEM may provide the FSE with the new power unit start-up program passcode 52 having a predetermined number of start/stop cycles allow the power unit 22 to temporarily start up and operate while a permanent new power unit start-up program passcode 52 is obtained. As with the time based passcode, the predetermined number of start/stop cycles may include any number of cycles ranging from a single start/stop to hundreds of start/stops, as established by the OEM.

In a non-limiting embodiment of the system 11, the system 11 further includes theremote server 80. In a non-limiting embodiment, the remote server 80 is configured to store the new power unit start-up program passcode 50 and provide the vehicle ECU 40 with the new power unit start-up program passcode 50 when the vehicle ECU 40 makes a request. In contrast to requiring the FSE to provide the OEM with the information detailed above, the vehicle ECU 40 can provide the remote server 80 with the information automatically and request the new power unit start-up program passcode 50 directly from the remote server 80. While not disclosed herein, one skilled in the art will appreciate that the vehicle ECU 40 may communicate with the remote server 80 using the Internet via any number of connections and communication protocols not contemplated by the present disclosure.

In a non-limiting embodiment of the system 11, the vehicle ECU 40 is configured to alert the remote server 80 when the new power unit start-up program passcode 52 stored in the memory 44 does not match any of the predetermined ECU passcodes 48. In a non-limiting embodiment of the system 11, the vehicle ECU 40 is configured to alert the remote server 80 when the power unit ECU 24 is disconnected from the communications bus 30 or when the new engine component 70 is connected to the communications bus 30. In this way, the vehicle ECU 40 can alert the remote server 80, and the OEM, of situations in which unauthorized maintenance or tampering of the vehicle 13 occurs.

In a non-limiting embodiment of the system 11, the vehicle ECU 40 is configured to disable the power unit 22 when the new power unit start-up program passcode 52 does not match any of the predetermined ECU passcodes 48. For example, the vehicle ECU 40 may disable the power unit 22 by transmitting a disabling signal to the power unit ECU 24 over the communications bus 30. Such a situation may occur when unauthorized maintenance or tampering of the vehicle 13 occurs and the FSE or technician tries to circumvent the system 11. In this way, the system discourages unauthorized maintenance or tampering of the vehicle 13 and forces the FSE or technician to obtain the new power unit start-up program passcode 52 from the OEM or risk disabling the power unit 22.

While the systems 10, 11 have been described with respect to power units 20, 22, the systems 10, 11 may be implemented with other vehicle components that are connected to the communications bus 30 that require routine maintenance. For example, discreet components like sensors or more complex systems like HVAC systems could be authenticated using systems 10, 11. In this way, the systems 10, 11, can help discourage unauthorized tampering and maintenance of vehicles 12, 13.

Figure 7:
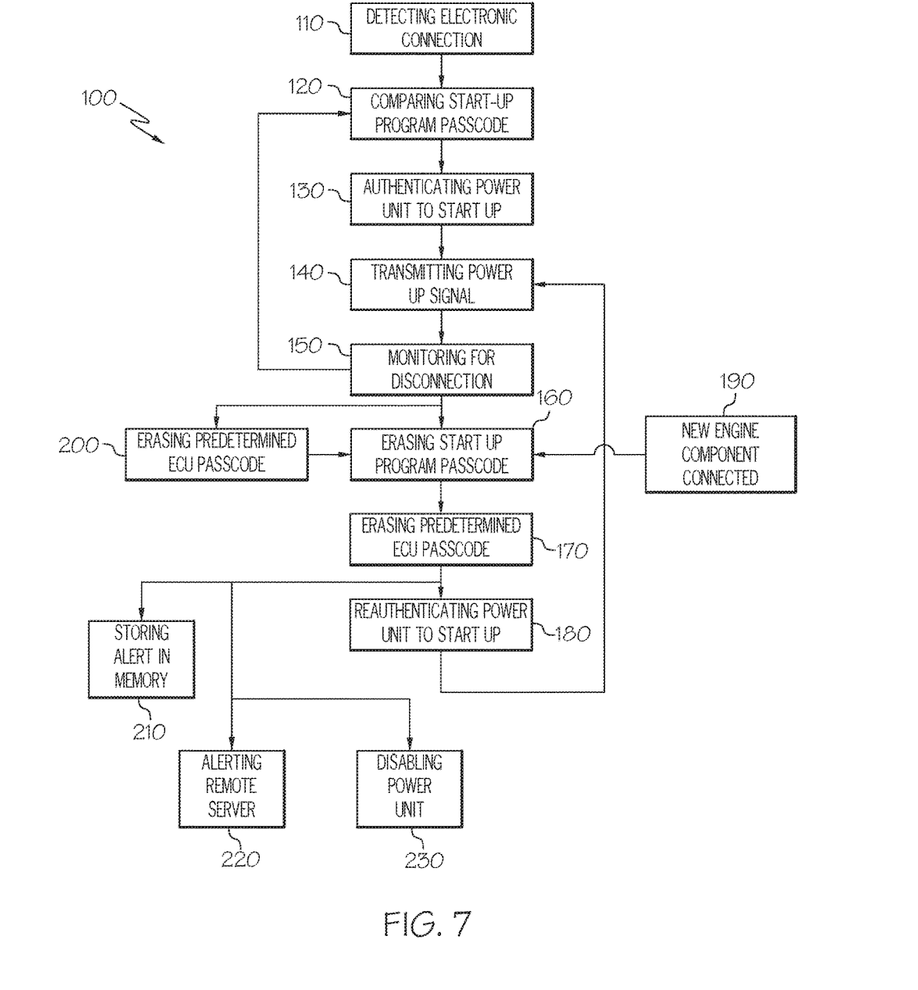
FIG. 7 is a flow chart illustrating a method for validating a vehicle component with the systems shown in FIGS. 1-6.

Referring now to FIG. 7, and with continued reference to FIGS. 1-6, a flowchart illustrates a method 100 performed by the systems 10, 11 of FIGS. 1-6 in accordance with the present disclosure. As can be appreciated in light of the disclosure, the order of operation within the method 100 is not limited to the sequential execution as illustrated in FIG. 7, but may be performed in one or more varying orders as applicable and in accordance with the requirements of a given application.

In various exemplary embodiments, the systems 10, 11 method 100 are operated based on predetermined events, such as attempting to start up the vehicles 12, 13. Method 100 may be performed by the systems 10, 11 or may be performed by any other suitable device or system configured in a manner consistent with the teachings of the present disclosure. Unless otherwise noted, the method 100 may be performed by any of the embodiments of the systems 10, 11 previously described above.

The method 100 starts at block 110 detecting an electronic connection between a vehicle electronic control unit (ECU) and a power unit over a communications bus. In a non-limiting embodiment, the vehicle ECU 40 detects the electronic connection between the vehicle ECU 40 and the power unit 20 over the communications bus 30. At block 120, the method 100 compares a power unit start-up program passcode stored in a memory of the vehicle ECU to at least one predetermined ECU passcode. In a non-limiting embodiment, the vehicle ECU 40 compares the power unit start-up program passcode 46 stored in the memory 44 of the vehicle ECU 40 to at least one predetermined ECU passcode 48.

At block 130, the method 100 authenticates the power unit to start up with the vehicle ECU when the power unit start-up program passcode matches the ECU passcode. In a non-limiting embodiment, the vehicle ECU 40 authenticates the power unit 20 to start up when the power unit start-up program passcode 46 matches the ECU passcode 48. At block 140 the method 100 transmits a power up signal from the vehicle ECU to the power unit when the power unit is authenticated. In a non-limiting embodiment, the vehicle ECU 40 transmits the power up signal to the power unit 20 when the power unit is authenticated. At block 150 the method 100 monitors the communication bus for when the power unit is disconnected from the communications bus. From block 150, the method 100 returns to block 120 and compares the start-up program passcode as necessary as long as a disconnection of the power unit does not occur. In a non-limiting embodiment, the vehicle ECU 40 monitors the communications bus 30 for then the power unit 20 is disconnected from the communications bus 30.

When the power unit is disconnected from the communications bus, the method 100 proceeds to block 160 and erases the power unit start-up program passcode from the memory of the vehicle ECU. In a non-limiting embodiment, the power unit start-up program passcode 46 is erased from the memory 44 of the ECU vehicle 40 when the power unit 20 is disconnected from the communications bus 30. At block 170, the method 100 stores a new power unit start-up program passcode in the memory. In a non-limiting embodiment, the new power unit start-up program passcode 52 is stored in the memory 44 of the vehicle ECU 40. At block 180, the method 100 re-authenticates the power unit with the vehicle ECU when the new power unit start-up program passcode matches another of the predetermined ECU passcodes. From block 180, the method 100 returns to block 140 and transmits the power up signal when the power unit is re-authenticated to start up. In a non-limiting embodiment, the vehicle ECU 40 re-authenticates the power unit 20 to start up when the new power unit start-up program passcode 52 matches another of the predetermined ECU passcodes 48.

In this way, the method 100 authenticates a power unit to start up with a vehicle ECU when a power unit start-up program passcode matches at least one predetermined ECU passcodes. The method 100 erases the power unit start-up program passcode when the power unit is disconnected from the communications bus and re-authenticates the power unit to start up with the vehicle ECU when a new power unit start-up program passcode matches another of the predetermined ECU passcodes.

In a non-limiting embodiment, the method 100 further includes block 190 and monitors the communications bus for when a new engine component is connected to the communications bus. When a new engine component is connected to the communications bus, the method proceeds to block 160 and erases the power unit start-up program passcode from the memory. In a non-limiting embodiment, the vehicle ECU 40 monitors the communications bus 30 for new engine components 70 and erases the power unit start-up program passcode 46 from the memory 44 of the vehicle ECU 40 when a new engine component 70 is connected to the communications bus 30.

In a non-limiting embodiment, the method 100 further includes block 200 and erases the predetermined ECU passcode corresponding to the power unit start-up program passcode when the power unit is disconnected from the communications bus. Block 200 is performed in conjunction with block 160 in which the power unit start-up program passcode is also erased.

In a non-limiting embodiment, the method 100 further includes block 210 and stores an alert in the memory when the new power unit start-up program passcode does not match any of the predetermined ECU passcodes. In a non-limiting embodiment, the method 100 further includes block 220 and alerts a remote server when the new power unit start-up program passcode does not match any of the predetermined ECU passcodes. In a non-limiting embodiment, the method 100 further includes block 230 and disables the power unit when the new power unit start-up program passcode does not match any of the predetermined ECU passcodes. If any of block 210, block 220, or block 230 occur, the method 100 terminates and does not proceed to block 180.

Figure 8:
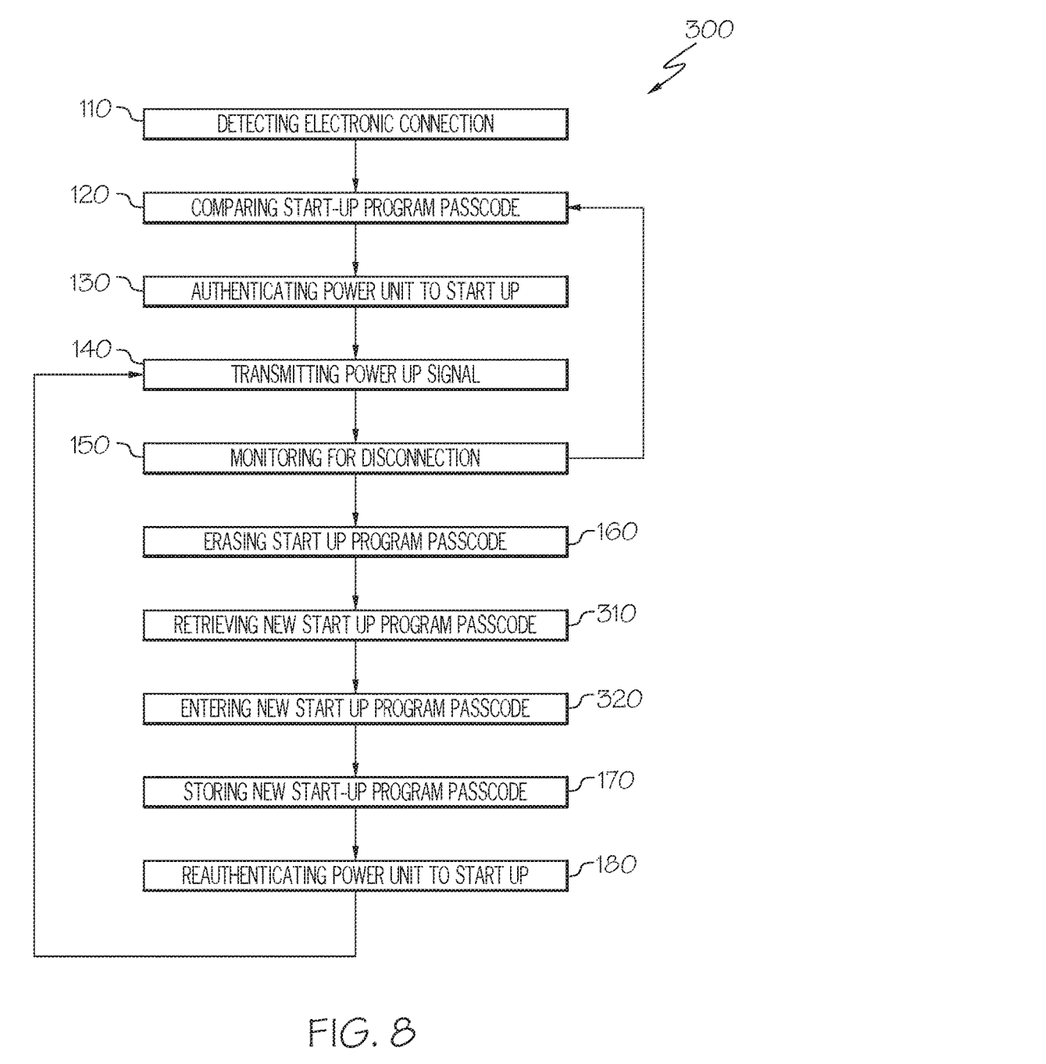
FIG. 8 is a flow chart illustrating a method for validating a vehicle component in accordance with another exemplary embodiment.

Referring now to FIG. 8, and with continued reference to FIGS. 1-7, a flowchart illustrates a method 300 performed by the systems 10, 11 of FIGS. 1-6 in accordance with the present disclosure. As can be appreciated in light of the disclosure, the order of operation within the method 100 is not limited to the sequential execution as illustrated in FIG. 8, but may be performed in one or more varying orders as applicable and in accordance with the requirements of a given application.

As method 300 includes many of the same blocks from method 100 from FIG. 7, the same block numbers will be used and referenced when appropriate. Accordingly, the discussion of method 300 will relate to the additional blocks not found in method 100. In a non-limiting embodiment, method 300 includes block 310 following block 160. In block 310, the method 300 retrieves the new power unit start-up program passcode from a remote server. The method 300 proceeds to block 320 and enters the new power unit start-up program passcode into the memory of the vehicle ECU. The method 300 proceeds to block 170 and stores the new power unit start-up program passcode in the memory of the vehicle ECU as previously described.

In a non-limiting embodiment of the method 300, the vehicle ECU 40 retrieves the new power unit start-up program passcode 50 from the remote server 80 and enters the new power unit start up program passcode 52 into the memory of the vehicle ECU 40.

One skilled in the art will appreciate that the depiction of the systems 10, 11 and the various components are merely exemplary and are not limiting with respect to size of the components or location within the systems 10, 11. Thus, the present disclosure is not limited to any specific layout and the systems 10, 11 may include additional electronic components not shown in its implementation.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for validating a vehicle component, the method comprising:
   detecting an electronic connection between a vehicle electronic control unit (ECU) and a vehicle power unit over a communications bus;
   comparing a vehicle power unit start-up program passcode stored in a memory of the vehicle ECU to at least one predetermined ECU passcode;
   authenticating the vehicle power unit to start-up with the vehicle ECU when the vehicle power unit start-up program passcode matches the ECU passcode;
   transmitting a power up signal from the vehicle ECU to the vehicle power unit when the vehicle power unit is authenticated;
   monitoring the communications bus for when the vehicle power unit is disconnected from the communications bus;
   erasing the vehicle power unit start-up program passcode from the memory of the vehicle ECU when the vehicle power unit is disconnected from the bus;

erasing the predetermined ECU passcode corresponding to the vehicle power unit start-up program passcode when the vehicle power unit is disconnected from the communications bus;

storing a new vehicle power unit start-up program passcode in the memory; and re-authenticating the vehicle power unit with the vehicle ECU when the new vehicle power unit start-up program passcode matches another of the predetermined ECU passcodes.

2. The method of claim 1, wherein the new vehicle power unit start-up program passcode is based on at least one of a vehicle identification number, an airframe identification number, an ECU identification number, a vehicle power unit identification number, or a combination thereof.

3. The method of claim 1, wherein the vehicle power unit start-up program passcode is erased from the memory when a new engine component is connected to the communications bus.

4. The method of claim 1, wherein the new vehicle power unit start-up program passcode is a time limit based passcode.

5. The method of claim 1, wherein the new vehicle power unit start-up program passcode is a stop/start cycle passcode with a predetermined number of start/stop cycles of the vehicle power unit.

6. The method of claim 1, further comprising
retrieving the new vehicle power unit start-up program passcode from a remote server; and
entering the new vehicle power unit start-up program passcode into the memory.

7. The method of claim 1, further comprising storing an alert in the memory when the new vehicle power unit start-up program passcode does not match any of the predetermined ECU passcodes.

8. The method of claim 1, further comprising alerting a remote server when the new vehicle power unit start-up program passcode does not match any of the predetermined ECU passcodes.

9. The method of claim 1, further comprising disabling the vehicle power unit when the new vehicle power unit start-up program passcode does not match any of the predetermined ECU passcodes.

10. A system for validating a vehicle component, the system comprising:
a communications bus;
a vehicle power unit in electronic connection with the communication bus; and
a vehicle electronic control unit (ECU) having a processor and a memory, the vehicle ECU in electronic connection with the communication bus, the vehicle ECU configured to detect an electronic connection between the vehicle ECU and the vehicle power unit and transmit a power up signal to the vehicle power unit when the vehicle power unit is authenticated to start up,
wherein the vehicle power unit is authenticated to start up when a vehicle power unit start-up program passcode stored in the memory of the vehicle ECU matches at least one predetermined ECU passcode,
wherein the vehicle ECU is configured to erase the vehicle power unit start-up program passcode from the memory of the vehicle ECU when the vehicle power unit is disconnected from the communications bus,
wherein the vehicle ECU is configured to erase the predetermined ECU passcode corresponding to the vehicle power unit start-up program passcode when the vehicle power unit is disconnected from the communications bus, and
wherein the vehicle ECU is configured to re-authenticate the vehicle power unit to start up when a new vehicle power unit start-up program passcode is stored in the memory that matches another of the predetermined ECU passcodes.

11. The system of claim 10, wherein the new vehicle power unit start-up program passcode is based on at least one of a vehicle identification number, an airframe identification number, an ECU identification number, a vehicle power unit identification number, or a combination thereof.

12. The system of claim 10, wherein the vehicle power unit start-up program passcode is erased from the memory when a new engine component is connected to the communications bus.

13. The system of claim 10, wherein the new vehicle power unit start-up program passcode is a time limit based passcode.

14. The system of claim 10, wherein the new vehicle power unit start-up program passcode is a stop/start cycle passcode with a predetermined number of start/stop cycles of the vehicle power unit.

15. The system of claim 10, further comprising a remote server configured to store the new vehicle power unit start-up program passcode.

16. The system of claim 10, wherein the vehicle ECU is configured to store an alert in the memory when the new vehicle power unit start-up program passcode does not match any of the predetermined ECU passcodes.

17. The system of claim 10, further comprising a remote server wherein the vehicle ECU is configured to alert the remote server when the new vehicle power unit start-up program passcode does not match any of the predetermined ECU passcodes.

18. The system of claim 10, wherein the vehicle ECU is configured to disable the vehicle power unit when the new vehicle power unit start-up program passcode does not match any of the predetermined ECU passcodes.

* * * * *